(12) United States Patent
Vadakital et al.

(10) Patent No.: US 7,751,324 B2
(45) Date of Patent: Jul. 6, 2010

(54) PACKET STREAM ARRANGEMENT IN MULTIMEDIA TRANSMISSION

(75) Inventors: Vinod Kumar Malamal Vadakital, Tampere (FI); Stephan Wenger, Tampere (FI); Miska Hannuksela, Ruutana (FI)

(73) Assignee: Nokia Corporation, Espoo (FI)

( * ) Notice: Subject to any disclaimer, the term of this patent is extended or adjusted under 35 U.S.C. 154(b) by 1478 days.

(21) Appl. No.: 10/993,918

(22) Filed: Nov. 19, 2004

(65) Prior Publication Data

US 2006/0109805 A1    May 25, 2006

(51) Int. Cl.
*H04L 1/00* (2006.01)
(52) U.S. Cl. .................. 370/231; 370/474; 370/493; 714/752
(58) Field of Classification Search .......... 370/229, 370/230, 230.1, 230.2; 714/752
See application file for complete search history.

(56) References Cited

U.S. PATENT DOCUMENTS

| | | | |
|---|---|---|---|
| 5,497,371 A * | 3/1996 | Ellis et al. .................... 370/412 |
| 5,892,545 A * | 4/1999 | Saunders et al. ......... 348/390.1 |
| 6,487,690 B1 | 11/2002 | Schuster et al. ............. 714/752 |
| 6,594,798 B1 * | 7/2003 | Chou et al. .................. 714/820 |
| 6,681,326 B2 | 1/2004 | Son et al. ..................... 714/755 |
| 6,681,362 B1 * | 1/2004 | Abbott et al. ............... 714/755 |
| 7,206,347 B2 * | 4/2007 | Lim et al. .............. 375/240.25 |
| 7,340,664 B2 * | 3/2008 | Shen ........................... 714/755 |
| 2001/0008542 A1 * | 7/2001 | Wiebke et al. .............. 375/141 |
| 2001/0048709 A1 * | 12/2001 | Hoffmann et al. ........... 375/130 |
| 2003/0206558 A1 | 11/2003 | Parkkinen et al. ........... 370/477 |
| 2004/0228413 A1 | 11/2004 | Hannuksela ........... 375/240.25 |
| 2004/0263361 A1 * | 12/2004 | Pearson et al. ................ 341/50 |
| 2005/0058206 A1 * | 3/2005 | Lim et al. ............... 375/240.25 |

FOREIGN PATENT DOCUMENTS

EP    1173028 A2    1/2002

OTHER PUBLICATIONS

"An RTP Payload Format for Generic FEC", Work in Progress, draft-ietf-avt-ulp-10.txt, Jul. 2004.
"An RTP Payload Format for Erasure-Resilient Transmission of Progressive Multimedia Streams", Work in Progress, draft-ietf-avt-uxp-07.txt, Oct. 2004.
RFC 2733, Request for Comments 2733, "An RTP Payload Format for Generic Forward Error Correction", Dec. 1999.

* cited by examiner

*Primary Examiner*—Jayanti K Patel
*Assistant Examiner*—Bo Hui A Zhu (57) ABSTRACT

Transmitting media information from a transmitting device to a receiving device. To perform the transmission a media stream is encoded and packets are formed from the encoded media stream, the packets containing application data units, the application data units having a decoding order. At least two blocks are generated from the packets. The packets of the at least two blocks are organized into a first group and a second group, the first group being decodable without reception of said second group. The transmission order of the packets of said first group is arranged succeeding packets of said second group such that the application data units in the transmission order are at least partly in a different order than the decoding order.

27 Claims, 6 Drawing Sheets

PACKET STREAM ARRANGEMENT IN MULTIMEDIA TRANSMISSION

FIELD OF THE INVENTION

The invention relates to the transmission of a stream of coded media packets over an error prone channel, whereby the packets can be categorized in at least two different priorities and whereby a forward error correction code is used to protect the packets from erasures.

BACKGROUND OF THE INVENTION

The quality of transmission on most packet networks, for example IP networks, suffer from erasures. Erasures can happen due to many different causes, such as link errors, transmission segment or router overload, environmental factors (especially when a wireless link segment is involved) and so forth. It should be noted that transmission errors cannot be seen as a failure of a network element; instead, they are a normal operation conditions and network protocols and elements need to be designed to cope with such conditions. For the purpose to simplify later discussions relating to the present invention, two forms of erasures are defined. An impulse erasure is a loss of a single packet (both the packet before and after the packet in question, in transmission order, are received successfully). Burst erasures, in contrast, encompass at least two adjacent packets in transmission order.

To combat the negative impact on the perceived quality of reproduced media data that was subject to erasures, many different schemes are known. Feedback based retransmission uses reports about lost packets or lost media entities (for example lost coded pictures), to trigger some form of reaction by the sender in a closed loop. Source coding based media tools, such as Intra picture or Intra macroblock refresh in coded video, make the media itself more robust. Forward channel coding techniques, such as forward error correction or redundancy coding, improve the packet reception rate at the receiver in a media-unaware fashion. All these mechanisms add a certain amount of additional bit rate and a certain amount of latency. As a general rule, in terms of bit rate efficiency, feedback based tools are better than forward channel coding techniques, and these are better than source coding based techniques. However, in terms of delay, the ranking is just the opposite: source coding based techniques add the lowest additional delay (sometimes zero), channel coding techniques add somewhat higher delay, and feedback based techniques typically add very high delay.

For many media compression schemes, one can assign a category of importance to individual bit strings of the coded media, henceforth called priority. In coded video, for example non-predictively coded information (Intra pictures) have a higher priority than predictively coded information (Inter pictures). Of the Inter pictures, those which are used for the prediction of other inter pictures (reference pictures) have a higher priority than those which are not used for future prediction (non-reference pictures). Some audio coding schemes require the presence of codebook information before the playback of the content can start, and here the packets carrying the codebook have a higher priority than the content packets. When using MIDI, instrument definitions have a higher priority than the actual real-time MIDI stream. A person skilled in the art should easily be able to identify different priorities in media coding schemes based on the examples presented.

Priority can also be established based on "soft" criteria. For example, when a media stream encompasses audio and video packets, one can, in most practical cases, assume that the audio information is, from a user's perception's point of view, of higher importance than the video information. Hence, the audio information carries a higher priority than the video information. Based on the needs of an application, a person skilled in the art should be capable to assign priorities to different media types that are transported in a single media stream.

The loss of packets carrying predictively coded media has normally negative impacts on the reproduced quality. Missing data not only leads to annoying artifacts for the media frame the packet belongs to, but the error also propagates to future frames due to the predictive nature of the coding process. Most of the media compression schemes mentioned above implement a concept of independent decoder refresh information (IDR). IDR information has, by its very nature, the highest priority of all media bit strings. Independent decoder refresh information is defined as information that completely resets the decoder to a known state. In older video compression standards, such as ITU-T H.261, an IDR picture is identical to an Intra picture. Modern video compression standards, such as ITU-T H.264, contain reference picture selection. In order to break all prediction mechanisms and reset the reference picture selection mechanism to a known state, those standards include a special picture type called IDR picture. For the mentioned audio and MIDI examples, an IDR consists of all codebook/instrument information necessary for the future decoding. An IDR period is defined herein to contain media samples from an IDR sample (inclusive) to the next IDR sample (exclusive), in decoding order. No coded frame following an IDR frame can reference a frame prior to the IDR frame.

A sequence of coded pictures from an IDR picture, inclusive, to the next IDR picture, exclusive, in decoding order, is henceforth called a Group of pictures (GOP) in this application. Pictures can be either reference pictures or non-reference pictures. It is also possible to encode video streams such that it contains so-called sub-sequences, and sub-sequences have a hierarchical dependency structure.

Figures 2A, 2B:
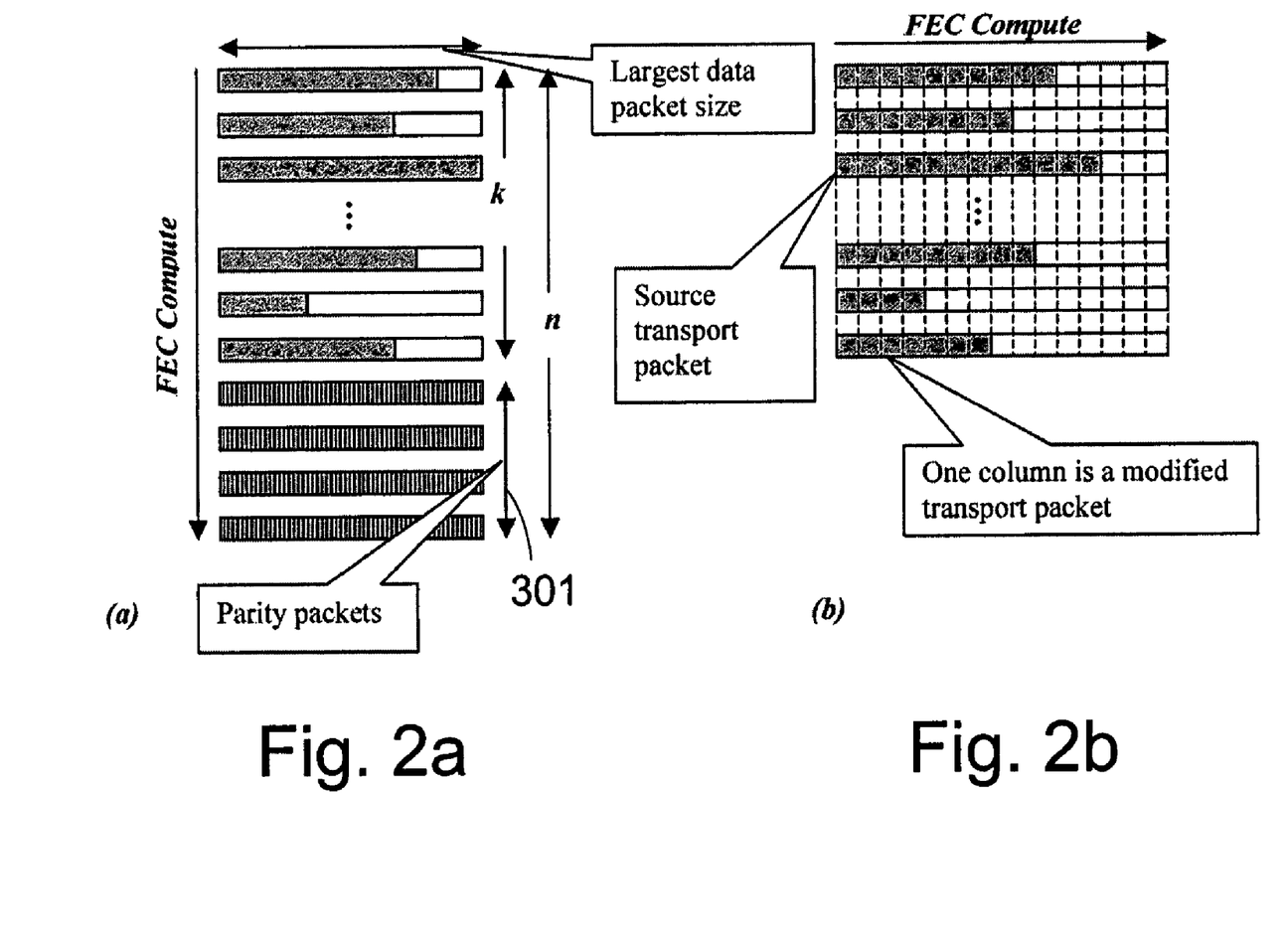
FIGS. 2a and 2b show two examples of FEC computations in a FEC matrix.

For example, packet-based Forward Error Correction (FEC) can be used to combat transmission errors. In order to allow FEC to effectively protect packets against erasures, a so-called "Matrix" or FEC block approach is commonly used. Two examples of FEC computations in a FEC matrix are illustrated in FIGS. 2a and 2b. The examples are described in greater detail later in this application, but a brief introduction is given here to introduce the field of invention. Media payloads are located into the FEC matrix in a deterministic way. For example, in FIG. 2a each row corresponds to one transport packet, and transport packets are padded with stuffing bits to make their sizes equal. The media data in the FEC matrix is also referred to as the source block. FEC coding is using a certain scan-order in the media data. For example, FIG. 2a, media data is scanned column by column, and for each column a certain number of FEC repair symbols is created. The repair symbols are located into the FEC matrix and packetized to transport packets in a pre-defined manner.

Video Compression

In hybrid video coders, an input video picture frame is divided, for processing purposes, into blocks of, for example, 16×16 pixels (pels), called macro-blocks. Each macro-block comprises, for example, blocks carrying processed sample values of one of three components: one luminosity component Y, and two chrominance components Cb and Cr. One or more macro-blocks can be combined to form a slice. The concept of slicing was developed to enable encoders to fit video data into the Maximum Transfer Unit (MTU) of a transmission channel. The use of slices breaks the in-frame prediction commonly used in hybrid video coders.

Figure 1:
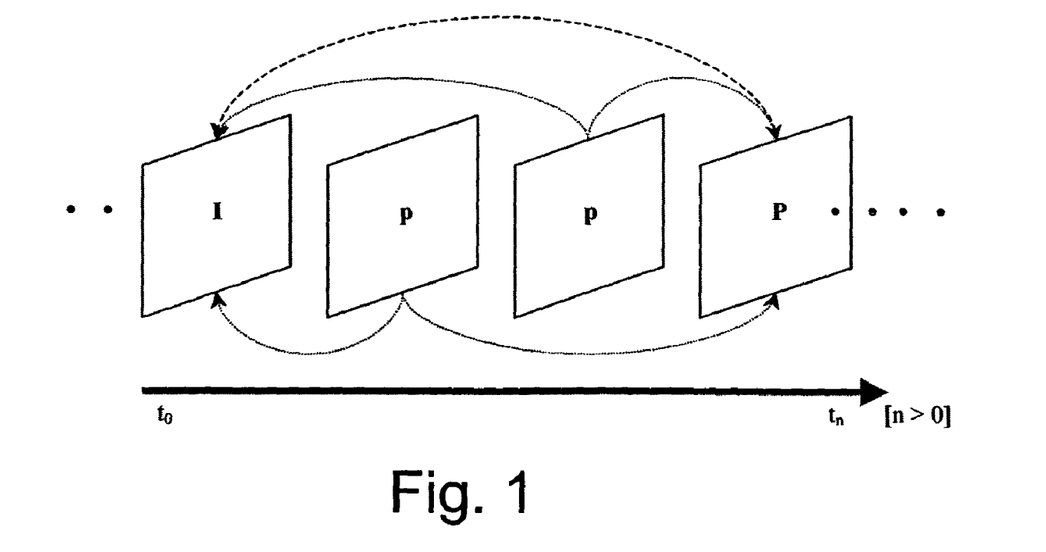
FIG. 1 illustrates the Reference and Non-Reference Pictures in a simplified manner.

Reduction of temporal redundancies, in video, is achieved by predicting the current to-be-coded frame from previous or future picture frames. A frame used for this kind of prediction purposes is called a reference frame. Some of the coded frames in a sequence can, as a matter of the encoder's choice, not be used for prediction. These frames are called non-reference frames. Slices belonging to non-reference frames are called non-references slices, and slices belonging to the reference frames are called reference slices henceforth. FIG. 1 illustrates the Reference and Non-Reference Pictures in a simplified manner. In previous research, the use of non-reference frames has been shown to improve compression efficiency, as well as provide a mechanism of temporal scalability.

In modern video compression standards, more than one reference frame can be used to predict macroblocks of the slice to be coded. It has been shown that the use of more than one reference frames can improve the compression efficiency of the codec and also make the coded video more robust to errors.

Wireless Networks

Due to the huge popularity, and the growing demand for IP based services, most current wireless data networks, are migrating from a circuit switched networks to packet switched networks. This allows the wireless networks to provide most or all of the services available on the Internet. Moving towards this goal, new protocol architectures like GPRS and UMTS have been standardized, or are in the process of standardization.

The 3rd Generation Partnership Project (3GPP) produces a complete set of globally applicable technical specifications and reports, for a 3rd generation systems based on the evolved Global System for Mobile Communication (GSM) core networks and the Universal Terrestrial Radio Access (UTRA) networks. Packet based air interfaces like CDMA2000, Edge, and WCDMA are the result of the standardization efforts of 3GPP/3GPP2.

In the following, some problems of previous solutions are shortly discussed.

Stream Synchronization and Initial Buffering Delay

Figure 6:
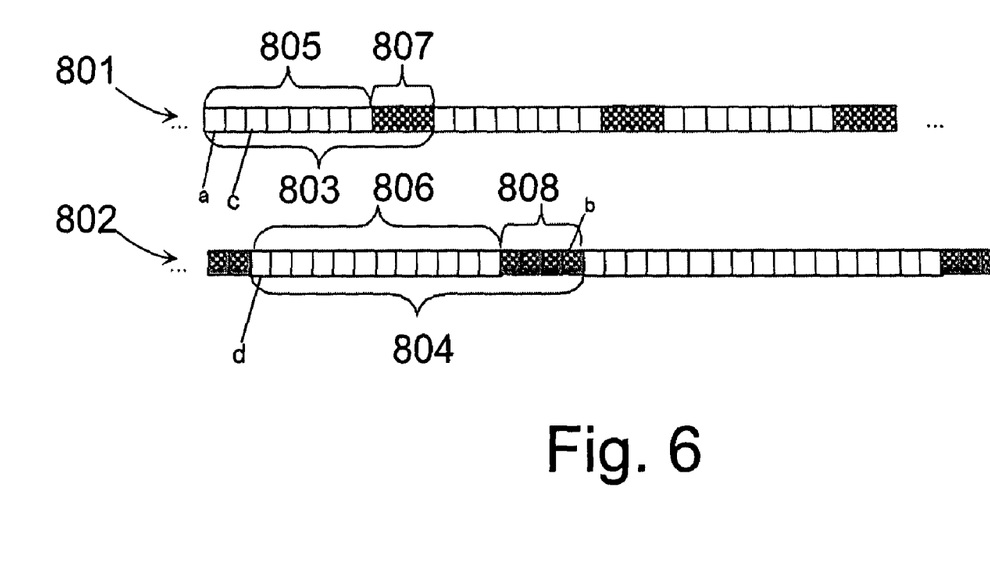
FIG. 6 depicts an example of non-aligned FEC blocks between streams.

FIG. 6 presents an example showing a part of audio-video stream in Multimedia Broadcast/Multicast Service (MBMS) streaming delivery. Decoding and transmission order within a stream goes from left to right. It is further assumed that the presentation order of media packets 805, 806 is the same as their decoding order and that the location of the media samples in the streams 801, 802 depicted in FIG. 6 also indicates the approximate presentation time. The media packets of the streams 801, 802 are divided into FEC blocks 803, 804. The FEC blocks 803, 804 comprise media packets 805, 806 and repair packets 807, 808.

To maximize the probability of correct reception of media samples a and c, the receiver should delay the decoding of the corresponding FEC block 803, 804 until all the repair packets 807 of the FEC block 803, 804 are received. Similarly, to maximize the probability of correct reception of media sample d, the receiver should delay the decoding of the corresponding FEC block until all the repair packets of the FEC block are received.

Audio media frame c is supposed to be played out simultaneously to video picture d. Therefore, media decoding and rendering of the corresponding audio FEC block 803 must actually be delayed until the video FEC block 804 containing sample d is completely received.

The initial buffering delay before media decoding and rendering is derived as follows: the maximum difference of reception time of the last packet of FEC block B and the first packet of FEC block A is calculated for any such pair of FEC blocks (A,B) in streams 1 and 2 respectively, in which the smallest RTP timestamp in FEC block A is within the range of RTP timestamps of FEC block B, and the last packet of FEC block A is received later than the last packet of FEC block B.

For two streams in an MBMS streaming session, the additional initial buffering delay is a sum of maximum differences between streams 1 and 2 and streams 2 and 1.

Tune-in Delay

A receiver in multicast/broadcast may not start reception from the first packet of a FEC block. If packets are transmitted in decoding order and if each packet is predictively coded (e.g. P pictures in video coding), then decoding of media data can only start once the synchronization to the FEC block structure is achieved. In addition, to produce correct output samples, the decoding process of the media decoder has to be reset e.g. with an IDR picture of H.264/AVC. The tune-in delay into a middle of broadcast/multicast therefore consists of the following parts:

First, the delay until the first packet of a FEC block is received. After that it takes some time to receive a complete FEC block (reception duration). Also the size variation of FEC blocks need to be compensated as well as the synchronization between the streams of the MBMS streaming session. Finally, the tune-in delay is also affected by the delay until a media decoder is refreshed to produce correct output samples.

Unequal Protection

Predictively coded media, and especially predictively coded video is notorious for not being gracefully degradable. That is, when the channel conditions (as perceived by the video decoder) detiorate, the quality of video is reduced remarkably. In contrast to this, analog TV picture just gets noisier but is still usable—though annoying. It would be more desirable to have a perfect-quality picture in good channel conditions and an acceptable-quality picture in bad channel conditions.

Many methods for degradation in multicast/broadcast streaming are based on scalable video coding. In H.264/AVC, both non-reference pictures and sub-sequences can be used to achieve temporal scalability while compression efficiency improves or stays unchanged compared to non-scalable coding. When a non-reference picture or a sub-sequence in layer 1 or above is lost or corrupted, the impact of the error does not propagate in time. Therefore, at least some degradation can be achieved when the "base layer" is protected such that it is always received and the "enhancement layer" (the layer 1 or above) is protected such that it is received when the channel conditions are sufficiently good.

The computation of the FEC as discussed above is normally performed using a so-called FEC matrix. Two examples of FEC computations in a FEC matrix are illustrated in FIGS. 2a and 2b. In FIG. 2a, each row corresponds to one transport packet. FEC coding is performed vertically. Transport packets are padded with stuffing bits to make their sizes equal. The stuffing bits are removed after the parity packets are generated and so, the stuffing bits are not transmitted. Each source packet is protected by an (n, k) code, where n is the total number of transport packets (along with the FEC packets), and k is the number of media packets that the FEC code protects. This method of FEC parity packet generation is described in detail in Adam Li, "An RTP Payload Format for Generic FEC", Work in Progress, draft-ietf-avt-ulp-10.txt, July 2004. In FIG. 2b, one row corresponds to source transport packet, one column corresponds to one modified transport packet, and FEC coding is performed horizontally. The source bits and parity bits for every source packets are distributed into many different modified transport packets, respectively. M. Wagner, J. Pandel, W. Weng, "An RTP Payload Format for Erasure-Resilient Transmission of Progressive Multimedia Streams", Work in Progress, draft-ietf-avt-uxp-07.txt, October 2004, uses a similar kind of FEC protection mechanism.

RFC2733 allows selective FEC, i.e. FEC packets include a bit-mask that signals the media packets over which the FEC is calculated. The mask field is 24 bits. If bit i in the mask is set to 1, then the media packet with sequence number N+i is associated with this FEC packet, where N is the sequence number (SN) Base field in the FEC packet header. The least significant bit corresponds to i=0, and the most significant to i=23. The SN base field is be set to the minimum sequence number of those media packets protected by FEC. This allows for the FEC operation to extend over any string of at most 24 packets.

The publication Adam Li, "An RTP Payload Format for Generic FEC", Work in Progress, draft-ietf-avt-ulp-10.txt, July 2004, like RFC2733, specifies a payload format for generic Forward Error Correction (FEC) for media data encapsulated in RTP. It is also based on the exclusive- or (parity) operation, but builds on RFC2733 with a generalized algorithm that includes Uneven Level Protection (ULP). The payload format described in this draft allows end systems to apply protection using arbitrary protection lengths and levels, in addition to using arbitrary protection group sizes. It enables complete recovery or partial recovery of the critical payload and RTP header fields depending on the packet loss situation. Uneven level of protection can be applied for different parts of packets, i.e. the best protection of the first A bytes of each media packet, a weaker level of protection for the next B bytes in the packets, and no protection for the remaining bytes in the packets. This scheme is completely backward compatible with non-FEC capable hosts. Those receivers that do not use FEC can simply ignore the protection data.

The publication M. Wagner, J. Pandel, W. Weng, "An RTP Payload Format for Erasure-Resilient Transmission of Progressive Multimedia Streams", Work in Progress, draft-ietf-avt-uxp-07.txt, October 200], uses Reed-Solomon codes together with an appropriate interleaving scheme for adding redundancy, but allows for finer granularity in the structure of the progressive media stream. It provides mechanisms typical for mobile channels, where the long message blocks like IP packets are split up into segments of desired lengths, which can be multiplexed onto link layer packets of fixed size. It uses a matrix structure of L by N where L is the number of rows of N octets. The incoming RTP packet data bytes are filled such that more important data, usually in the beginning of the RTP packet occupy less number of columns in the matrix and the less significant data occupy the more number of columns in the matrix. RS parity code words are then computed across each of the N columns, each row then forming a valid code word of the chose RS code.

Both the above mentioned documents seem to solve the same problem, but with some essential differences in the methodology used. The main difference between both approaches is that while ULP preserves the structure of the packets which have to be protected and provides the redundancy in extra packets, the unequal erasure protection (UXP) scheme mentioned in draft-ietf-avt-uxp-07.txt interleaves the info stream which has to be protected, inserts the redundancy information, and thus creates a totally new packet structure.

Another difference concerns multicast compatibility: It cannot be assumed that all future terminals will be able to apply UXP/ULP. Therefore, backward compatibility could be an issue in some cases. Since ULP does not change the original packet structure, but only adds some extra packets, it is possible for terminals which do not support ULP to discard the extra packets. In case of UXP, however, two separate streams with and without erasure protection have to be sent, which increases the overall data rate.

When IP multicast is used, each receiver can select the number of multicast groups it wants to receive. Multicast groups are ordered such that the first multicast group provides a basic-quality decoded stream and each multicast group in their numbered order enhances the quality. It is known that layers of scaleable coded media can be streamed on different IP multicast groups and a multicast group may contain FEC to improve the quality of data in that multicast group or any "lower" multicast group. More information on this issue can be found e.g. in Philip Chou et al., U.S. Pat. No. 6,594,798.

SUMMARY OF THE INVENTION

The invention presents a method to reduce the tune-in delay in multicast/broadcast and to reduce the impact of transmission errors, by reordering the transmission order of application data units (ADUs) within a media stream and among the streams of the same MBMS streaming session. The invention also enables unequal error protection of application data units in a transmission stream.

The method is mainly based on aligning the boundaries of FEC blocks of different streams. An aligned structure of FEC blocks across media streams is referred to as an inter-stream FEC frame. Consequently, no buffering delay is spent in receivers for inter-stream synchronization. In addition, media streams within an inter-stream FEC frame are transmitted in ascending order of importance. Consequently, receivers that start reception in the middle of an inter-stream FEC frame can decode the most important pieces of data with no remarkable additional delay.

According to the invention, a media stream is arranged in so-called super FEC blocks, each of which contains an integer number of consecutive FEC blocks in a transmission order. All media samples in a super FEC block succeed (in decoding order) any media sample in previous super FEC blocks in transmission order and follow (in decoding order) any media sample in succeeding super FEC blocks in transmission order. The boundaries of a super FEC block in a media stream in terms of intended decoding time are within a defined limited range compared to the intended decoding time of a super FEC block of the other media streams in the same MBMS streaming session. Transmission of super FEC blocks of a MBMS streaming session is organized such that consecutive super FEC blocks in decoding order in any stream are transmitted consecutively (i.e. not interleaved). Super FEC blocks the same inter-stream FEC frame may be interleaved. ADUs within a super FEC block of a media stream may be interleaved. Some example embodiments for interleaving according to the invention are described below.

All of the presented aspects of the invention are based on the fact that a super FEC block is the minimal unit for random access in a stream protected by a FEC code. A receiver has to buffer data initially for at least one super FEC block before starting decoding and playback. A receiver in multicast/broadcast may not start reception from the first packet of a super FEC block. If packets were transmitted in decoding order and if each packet is predictively coded based on the reception and decoding of previous packets, no data in a super FEC block would result into meaningful decoded representation unless the super FEC block would be entirely received. The idea of the invention is to transmit the data in an order that allows decoding of meaningful representation of the data in the first received super FEC block even if it is not received from the beginning.

According to one aspect of the invention, media types are ranked according to their subjective importance. For example, in most content types, such as news reading, audio is subjectively more important than video. The transmission order of super FEC blocks of the MBMS streaming session is arranged such that for a certain inter-stream FEC frame, the super FEC blocks are sent in order of subjective preference, from the least important to the most important. For example, a super FEC block of video is sent before the corresponding super FEC block of audio, because it is probably subjectively pleasing that audio playback is started as soon as possible, even if video could not be played back yet. In our example, super FEC boundaries of video are aligned with IDR period boundaries and audio super FEC boundaries are aligned accordingly with video IDR periods. Video super FEC block is transmitted earlier than the corresponding audio super FEC block. This transmission order increases the possibility that at least audio can be decoded and played back from the first FEC block after tuning in.

According to one aspect of the invention, a media stream is organized to super FEC blocks such that
- Media samples are organized into more than one group according to the prediction hierarchy of the media samples such that one group is predictively independent from the other groups. For example, a video stream may be organized to a group of reference pictures and a group of non-reference pictures.
- The groups are arranged in an importance order such that each group improves the subjective quality of the decoded stream compared to the decoding result of the earlier groups in the list.
- A FEC matrix is generated for each group. A FEC code may not be applied for some groups.
- For each group, such number of packets among the media packets and the repair packets for the group is selected that allows recovery of the original media samples of the group in error-free transmission. These selected packets are referred to as integral group herein. All the media samples of the group are an example of an integral group when a systematic FEC scheme is applied.
- Integral groups are transmitted in ascending order of importance. For example, for a video stream grouped to non-reference and reference pictures, non-reference pictures of a super FEC block are transmitted before the reference pictures of a super FEC block.
- Packets that are not part of integral groups can be sent freely within a super FEC block.

It should be noted that the predictively independent group discussed above may have prediction dependencies on other super FEC blocks. For example, a group consisting of inter-coded reference pictures only refers to earlier reference pictures residing in earlier super FEC block(s) in the inter-prediction process of video decoding. Decoding process can also be started from a coded sample that does not cause a complete decoding refresh, but then the decoder should be aware that such a stream may contain references to samples not available for prediction reference. Obtaining correct uncompressed samples as output may require decoding of several coded samples.

According to one aspect of the invention, a super FEC block contains data from more than one IDR period. IDR periods are transmitted in decoding order. Media samples within an IDR period are organized into groups according to the prediction hierarchy of the media samples such that one group is predictively independent from the other groups. Transmission order of groups within an IDR period is selected identically to what is described in the previous aspect in the invention.

According to one aspect of the invention, groups of different media types of corresponding super FEC blocks are organized in subjective order of importance. The corresponding integral groups are then sent in ascending order of subjective importance. For example, in an audio-video session with closed captions, the order of preference may be (from the highest importance to lowest): audio, video "key" pictures in which the closed captions change, closed captions, other pictures of video.

According to one aspect of the invention, a super FEC block is formed to contain an integer number of IDR periods. In other words, media samples of an IDR period are contained in one super FEC block only.

It is possible to construct a video stream including so-called open GOPs. An open GOP is such that it begins with an intra picture (but not an IDR picture). The intra picture is used as a inter-prediction reference for at least one picture that precedes the intra picture in output order (but of course follows the intra picture in decoding order). Such a picture is referred to as a leading picture herein.

According to one aspect of the invention, a super FEC block is formed to contain an integer number of IDR periods and open GOPs.

According to one aspect of the invention, a defined amount of overlap in decoding order or time is allowed between consecutive super FEC blocks of a stream. For example, super FEC blocks may be constructed such that an intra picture starting an open GOP is the first picture in decoding order within each super FEC block. The leading pictures referring to an intra picture starting a super FEC block in inter-prediction process are, however, part of the previous super FEC block.

According to one aspect of the invention, packets within a group (as specified above) are sent in reverse decoding order.

According to one aspect of the invention, FEC code rate, i.e. error resilience strength, is selected for FEC blocks among one super FEC block according to the prioritization of the FEC blocks (The strongest protection for the most important FEC block.)

According to one aspect of the invention, FEC code rate, i.e. error resilience strength, is selected for FEC blocks among all super FEC blocks in the same inter-stream FEC frame according to the prioritization of the FEC blocks.

The invention provides advantages when compared with solutions of prior art. For example, the tune-in delay can be reduced in some situations. Further, subjective quality degradation of the coded video, due to error propagation may also be reduced. The invention provides a novel way for selective FEC (i.e. selection of which packets are protected). The inter-leave-alignment signal enables that the de-interleaving buffering can be done "in-place", i.e. in the FEC decoding buffer after FEC decoding is applied for a FEC block. Then, ADUs of that FEC/media block can be output in their decoding order. Without the interleave-alignment signal, de-interleaving should be done after FEC decoding buffering as a separate step, including additive initial buffering delay.

The invention allows, in the environment discussed above, to reduce the tune-in time by arranging the individual, to-be protected media packets in the FEC block such that the packets with the highest priority are placed last into the FEC block.

DESCRIPTION OF THE DRAWINGS

In the following the present invention will be described in more detail with reference to the appended drawings, in which.

DETAILED DESCRIPTION OF THE INVENTION

Figure 5:
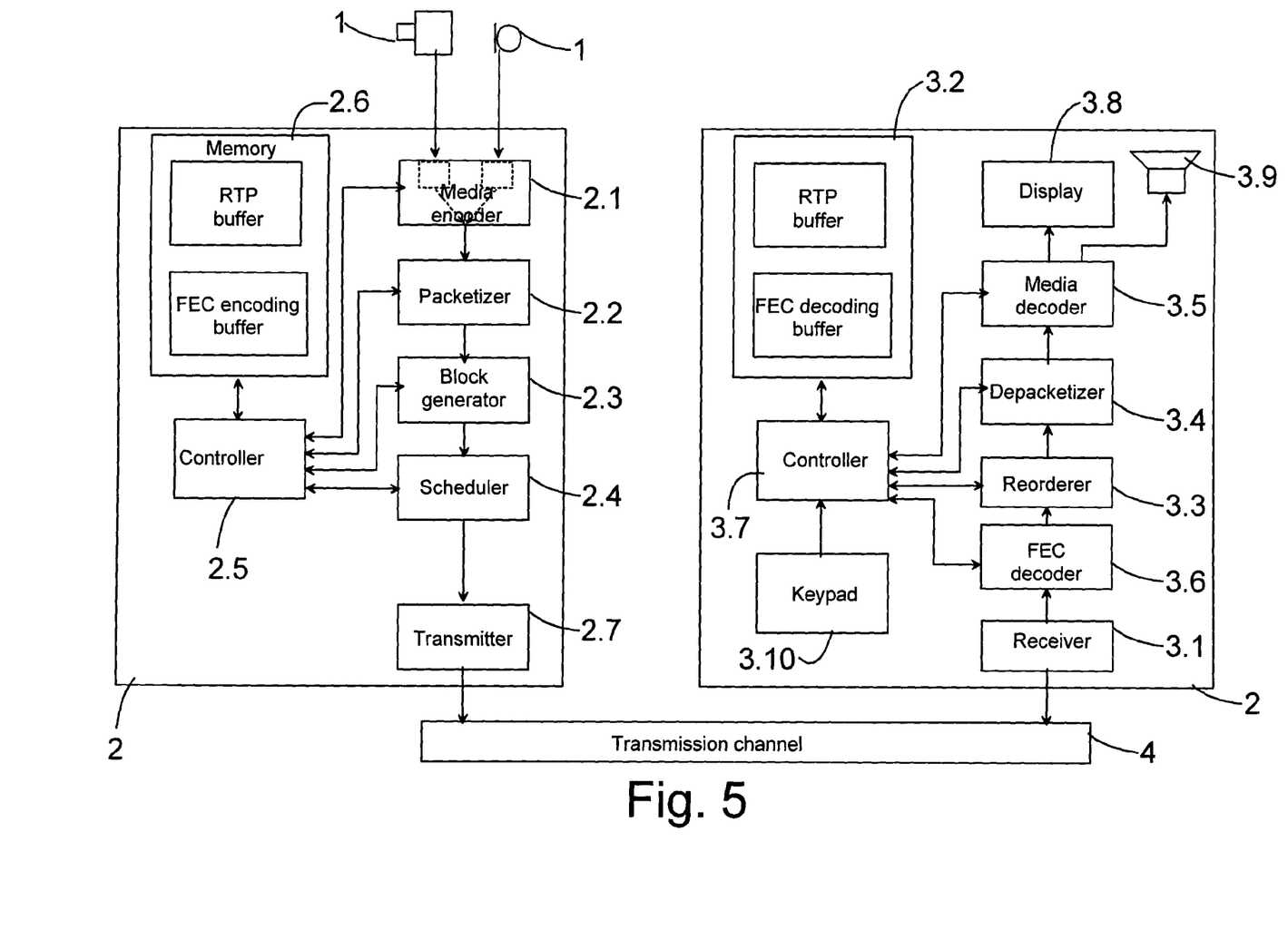
FIG. 5 depicts a system according to an example embodiment of the present invention.

In FIG. 5 there is depicted an example of a system according to the present invention. The system comprises one or more media sources 1, such as video, audio and/or data sources. The media from the media source 1 is transferred to a transmitting device 2 comprising an encoder 2.1 for encoding the media data, a packetizer 2.2 for forming packets from the encoded media data, a packet block generator 2.3 for generating blocks such as FEC blocks (803, 804 in FIG. 6) and super FEC blocks from the packets. There is also an orderer 2.4 for scheduling the packets of the FEC blocks and super FEC blocks for transmission. The transmitting device 2 further comprises a controller 2.5 for controlling the transmitting device 2. It should be noted here that some of the operational blocks 2.1-2.4 may be implemented in the controller 2.5, for example as a software program comprising machine executable steps for performing the operations of the operational blocks. There is also memory 2.6 for storing information e.g. the packets to be transmitted. One or more buffers may be formed in the memory comprising storage places for storing the packets and other data, when necessary. The transmitter 2.7 forms signals carrying the packet information to be transmitted to the receiving device 3 either directly or via a transmission channel 4, such as a wireless or wired communications network.

It should be noted here that although there is only one encoder 2.1 and packetizer 2.2 shown in FIG. 5, the transmitting device 2 may comprise more than one encoder 2.1 and packetizer 2.2 for different kinds of media. For example, there can be a video encoder for encoding video information, an audio encoder for encoding audio information, a video packetizer for packetizing encoded video information, and audio packetizer for packetizing encoded audio information.

The packets are not necessarily transmitted to the receiving device 3 immediately but the packets can be stored into a storage medium, for example, a DVD, a CDROM, a flash memory, a video tape etc. In that case the transmitter 2.7 may form signals appropriate to the storage medium for storing the packet information.

It is also possible that the encoded media data is stored into a storage medium from where the stored media data can later be transferred to a transmitting device for transmission. In this case the transmitting device may not necessarily have the encoder. Also the encoder may be a separate device or in another device than the transmitting device 1.

The receiving device 3 comprises a receiver 3.1 for receiving the transmitted packets, a memory 3.2 for storing the packets and other information, a re-orderer 3.3 to reorder the packets into decoding order, a de-packetizer 3.4 for extracting the media data from the packets, and an decoder 3.5 for decoding the packets i.e. media data carried by the packets. The decoding is not necessarily started immediately after a packet is received but the receiving device 3 has to buffer some of the packets before starting the decoding. This will be described in more detail later in this description.

The receiving device 3 may also comprise a corrector 3.6 such as FEC decoder for correcting lost and/or corrupted packets by using the error correction data which may have been transmitted from the transmitting device 1. The optional error correction is performed before re-ordering the packets into decoding order.

The re-orderer 3.3 can use an ordering information to reorder the packets to the correct decoding order. The ordering information may be transmitted with the packets or as a separate stream.

The receiving device 3 further comprises a controller 3.7 for controlling the operations of the receiving device 3. Some of the above mentioned operational blocks can be implemented in the controller 3.7, for example as a software. Decoded video information can be presented (played out) by the display 3.8 and decoded audio information can be presented by the loudspeaker 3.9. The keypad 3.10 can be used inter alia to give commands to the controller 3.7.

The transmitting device can be a server, a wireless communication device, a PDA device etc. The receiving device 3 can be a wireless communication device, a PDA device, a TV, a radio etc.

Although there is only one decoder 3.5 shown in FIG. 5, the receiving device 3 may comprise more than one decoder 3.5 and de-packetizer 3.4 for different kinds of media. For example, there can be a video decoder for decoding video information, audio decoder for decoding audio information, a video de-packetizer for de-packetizing encoded video information, and audio de-packetizer for de-packetizing encoded audio information. Further, the re-orderer 3.3 and the de-packetizer 3.4 can be the same operational block wherein the re-ordering and de-packetizing are performed by the same operational block either successively or in parallel.

Figures 3A, 3B:
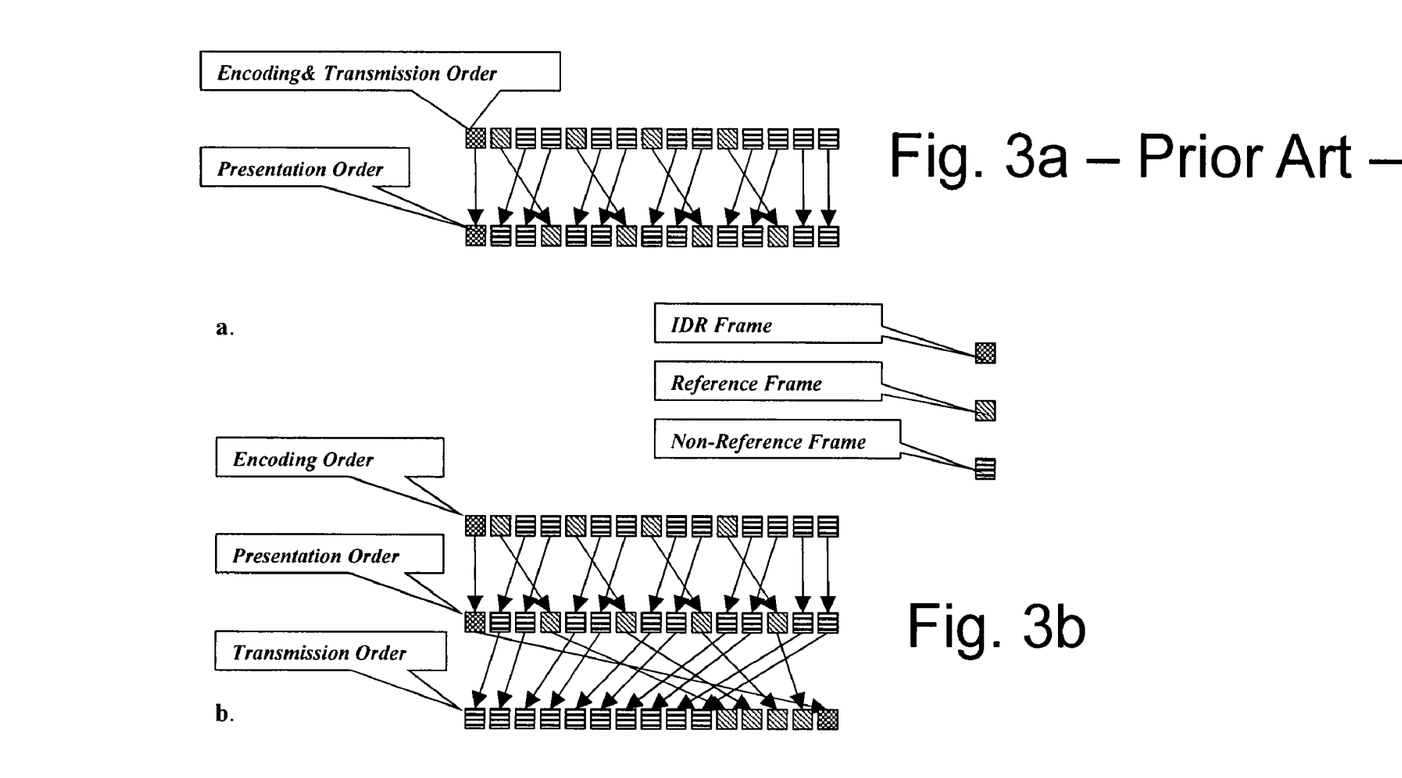
FIG. 3a shows the encoding, presentation and transmission order of the slices according to an example of prior art in a simplified manner.
FIG. 3b shows the encoding, presentation and transmission order of the slices according to an example embodiment of the present invention in a simplified manner.
Figure 4A:
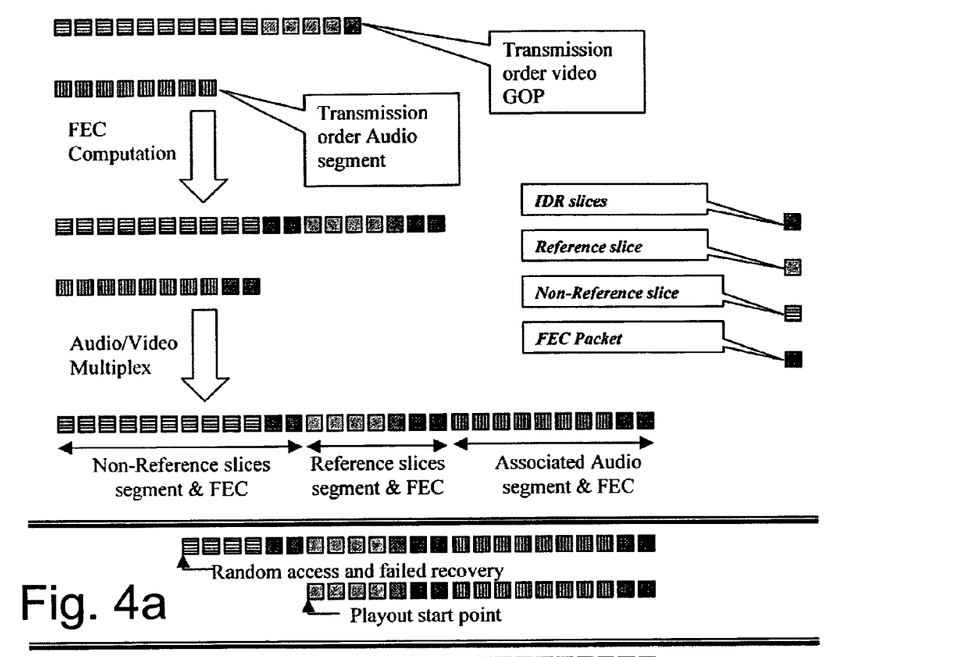
FIG. 4a shows reordering of reference and non-reference slices, and the computation of the associated FECs when Random access point is in between a non reference slice segment.
Figure 4B:
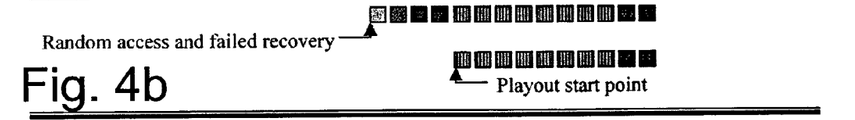
FIG. 4b shows reordering of reference and non-reference slices, and the computation of the associated FECs when random access point is in between a reference segment.
Figure 4C:
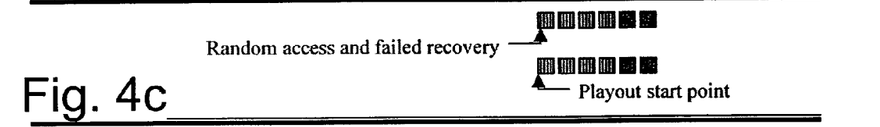
FIG. 4c shows reordering of reference and non-reference slices, and the computation of the associated FECs when random access point is in the associated audio segment.

In the following an example of the ordering of media packets of video information is described, assuming that each picture frame is coded into one slice and the IDR refresh rate interval is set to 15 frames, the FIG. 3a shows the encoding, presentation and transmission order of the slices according to an example embodiment of prior art in a simplified manner and, respectively, the FIG. 3b shows the encoding, presentation and transmission order of the slices according to an example embodiment of the present invention. In normal decoder operation, the decoder receives the slices in the encoding order, decodes the incoming slices, and buffers the decoded data, until the time of presenting the decoded video data. According to an example embodiment of the invention the reference slices and the non-reference slices, obtained after encoding, are further collected together and separate from each other like shown in FIG. 3b, before the actual transmission. In normal decoder operation, the decoder receives pictures in decoding order, decodes the incoming pictures, and buffers the decoded data, until the time of presenting the decoded video data. This invention clumps the reference slices and the non-reference slices, obtained after encoding, together and separate from each other like shown in FIGS. 3a and 3b, before the actual transmission.

In the following, an example method of the present invention will be described in more detail. The media stream, such as a video stream, is input to the encoder 2.1 which encodes the media information. The coding is typically type dependent i.e. the encoder 2.1 uses a different coding method for different kinds of media, or there are different encoders for different kinds of media as was mentioned above in this description. The encoder 2.2 may also form so called sub-sequences from a video stream. There can also be more than one sub-sequence. The basic stream of the coded pictures and the pictures of the sub-sequences form some kind of hierarchy in which pictures of the base level are more important than the pictures of higher levels i.e. pictures of the sub-sequences.

The encoded media information is packetized i.e. packets comprising encoded media information are formed in the packetizer 2.2. The packets are classified to separate different types of packets from each other and/or packets of different media are buffered in separate buffers. For example, when packetizing video or other picture stream information, there can be packets comprising reference data (reference packets) and packets comprising non-reference data (non-reference packets) in a group of pictures. The divider 2.3 divides the packets of the group of pictures into different groups according to the classification. In this example, the reference packets are divided into a first group of packets and the non-reference packets are divided into a second group of packets. The packets are buffered into the memory 2.6. It should be noted here that the divider need not always move the packets in the memory from one storage place to another when the packets are divided into different groups. The dividing may thus mean that the packets are only marked to indicate which group they belong to. The orderer 2.4 determines the transmission order for the packets. In an example embodiment of the present invention the transmission order is such that the packets of the second group are ordered to be transmitted before the packets of the first group of packets. Therefore, at least some of the packets are ordered to be transmitted in a different order than the decoding order of the packets. The transmission order of the packets in the same group may also be different from the decoding order of the packets.

The transmitting device 1 may also form error correction information such as forward error correction (FEC) information on the basis of the packets to be transmitted. The error correction information is transmitted as separate packets, for example. The orderer 2.4 also orders the time of transmission for the error correction packets. In this example embodiment, the error correction data is formed for both groups of packets. Therefore, at least one error correction packet is formed into the first group of packets on the basis of packets of that group. Respectively, at least one error correction packet is formed into the second group of packets on the basis of packets of that group.

The packets of the first group of packets can further be divided into one or more "error correction groups" depending on how the error correction data is formed. The error correction data is calculated for each such error correction group. The packets of the error correction group and the respective calculated error correction packets form an error correction block, which is referred as a FEC block in this description. The above method is applicable to all groups of packets. Hence, the second group of packets can also be divided into one or more error correction groups and, respectively, FEC blocks are formed.

The orderer 2.4 determines also the order for transmission for the error correction packets. The error correction packets are ordered to be transmitted, for example as the last packets of the FEC block in question but also other order can be used.

Figure 7:
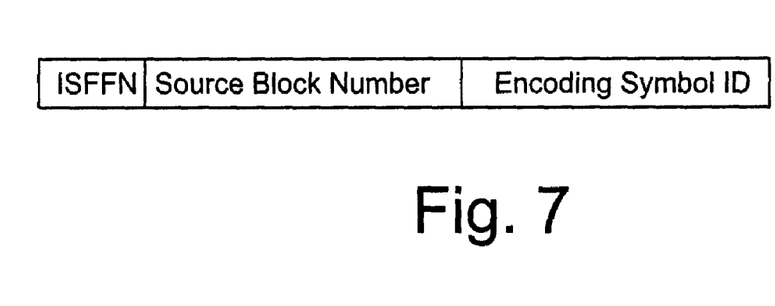
FIG. 7 depicts an example of the FEC payload ID.

When media streams of an MBMS streaming session are received by the receiving device 3, a timer for initial buffering delay is started when the first packet is received. When the first packet of a FEC block is received, its reception time relative to the timer is stored. Packets are located to FEC blocks according to their FEC payload identity (ID). An example of the FEC payload ID is depicted in FIG. 7. When the number of repair packets of a FEC block is sufficient to recover potentially lost media data in the FEC block, FEC decoding is applied. When the first FEC block is decoded, the expiration time is set to the reception time of the first packet of the FEC block+the signaled initial buffering delay within the FEC block. If the value of ISFFN changes in received packets, no FEC decoding can be applied for the first inter-stream FEC frame and no initial buffering delay can be recovered. Then, media decoding starts. Otherwise, the above mentioned steps are repeated, beginning from the storing the reception time of the first packet of a FEC block.

When the media decoding can be started, media decoders input coded media application data units according to their decoding pace (specific to media formats and decoder implementations) in decoding order from the FEC decoding buffer. In other words, de-interleaving of application data units from transmission order to decoding order can be done "in-place" and no additional buffer or buffering delay is required for de-interleaving. Reception of succeeding inter-stream FEC frames can also be carried out during the media decoding.

Some Considerations on Encoder and Transmitter Implementation

According to the present invention coded pictures of a GOP are ordered such that the IDR picture and the pictures in the "base level" of the hierarchy (e.g. in sub-sequence layer 0) are transmitted after the other pictures of the GOP. This reordering could be performed at any stage before the transmission of the coded pictures into the transmission channel 4. When separation to reference pictures and non-reference pictures is targeted, it is possible for the encoder 2.2 to build two queues, one for the reference slices and the other for non reference slices. After encoding of a picture the encoder 2.2 can flush the slices of the coded picture into one of the two queues, depending on whether the picture is a reference picture or a non-reference picture. The outputting of the slices in the queues could be done just before the next group of pictures is to be encoded. Another method, suitable for pre-encoded videos is to make the transmitting device 2 aware of the reordering and doing the same procedure as mentioned in the previous paragraph to be done at the transmitting device 2.

Signaling

In an example embodiment there are two possibilities for the interleaving of the packets: Interleaving packets of the same super FEC block only or interleaving across different super FEC blocks. The interleaving method which is used in the MBMS streaming session is signalled to the receiver using e.g. a parameter. For example, the following SDP parameter for the 3GPP FEC framework and RTP payload format can be defined.

Interleave-alignment: When the parameter it is set equal to 0, transmission order interleaving is not limited. When the parameter is set equal to 1, transmission order interleaving is limited not to cross any super FEC block boundaries. In other words, when interleave-alignment is equal to 1, all source RTP packets of all media samples in a super FEC block succeed (in decoding order) any media sample in previous super FEC blocks in transmission order and follow (in decoding order) any media sample in succeeding super FEC blocks in transmission order.

Inter-media Alignment

According to the invention, super FEC blocks of different media types should not overlap. In other words, the greatest RTP timestamp in a certain super FEC block of one media stream shall be smaller than the smallest RTP timestamp in any super FEC block of any media stream following in transmission order.

FEC MIME parameters are specific to a stream, i.e. one media type. Therefore a MIME parameter for signaling whether inter-media alignment is present in the MBMS streaming session is not necessary.

For MBMS streaming, the transmitting devices may obey the restriction above for inter-media alignment. Considerations on receiver and decoder implementation The de-interleaving buffering and FEC decoding buffering can be implemented in the same buffer. The buffer holds at least one super FEC block. After FEC decoding of the super FEC block, the output from the buffer happens in decoding order. This way an additional delay and buffer space required for de-interleaving buffering may be avoided. The same applies in the transmitting end for interleaving and FEC encoding buffering.

EXAMPLE OF TUNE-iN DELAY REDUCTION

A simplified example according to the implementation follows: it is assumed that each picture frame is coded into one slice and the IDR refresh rate is set to 15. Two non-reference pictures (marked as "p") are coded between each reference picture (either IDR picture, marked as "I", or reference inter picture, marked as "P"). The presentation order of a part of the video sequence would be (from left to right)

... [I0][p2][p3][P1][p5][p6][P4][p8][p9][P7][p11] [p12][P10 ][p13][p14][I15]

The encoding and decoding order would then be according to the value of the subscripts printed next to the picture types above. The number of reference frames in this GOP example is five and the number of non reference frames is ten.

Let us further assume that the picture rate in this example is 15 Hz, the bitrate of the video stream is 80 kbps, and half of the bitrate is spent for reference pictures and the other half for non-reference pictures. Let us also assume that typically fewer than or equal to one packet per GOP get lost (7% packet loss rate), but the service provider wants to get an acceptable quality in occasional "bad" channel conditions in which up to three packets per GOP may get lost (20% packet loss rate).

If we assume conventional Reed-Solomon coding for error correction, four FEC repair packets should be sent per GOP to guarantee that three FEC repair packets per GOP are received on average and recover up to three lost media packets per GOP. When assuming no padding overhead in construction of FEC matrix (which may be over-optimistic), the FEC causes 27% bitrate increase compared to the video bitrate.

When a weaker protection is used, FEC1 is applied to the non-reference pictures of a GOP, one FEC repair packet is able to recover one lost non-reference video frame. Hence the average correction capability to correct a non-reference frame is around 9%. If we assume that the packet loss rate is proportional to the bitrate share, then an overall packet loss rate of 20% implies a 10% packet loss rate for the reference pictures. One FEC repair packet FEC2 is computed over all the reference pictures of a GOP, it is capable of recovering from an average packet loss rate up to 17%. Thus, one FEC repair packet is sufficient for "bad" channel conditions. Cumulatively, the overhead for FEC2 and FEC1 is around 13%. This figure is half of the overhead than for the previous case when a single chunk of FEC codes protected the entire video data of the GOP.

With the issue of tune-in delay, under normal circumstances, when a user tunes in to a middle of a broadcast/multicast in our example, the average media buffering delay before reception of the first IDR picture is 0.5 seconds, i.e. half of the IDR picture interval. Let us assume that IDR pictures are aligned with FEC matrix and that the duration of media in FEC blocks is constant, then the receiving device 3 should buffer for the first FEC block to guarantee pause-less decoding and playback, and full FEC correction capability. Hence, the average tune-in delay would then be 1.5 seconds.

According to the invention, the sender reorders reference pictures and non-reference pictures in a transmission order as follows:

... [p2][p3][p5][p6][p8][p9][p11][p12][p13][p14] [FEC1][I0][P1][P4][P7][P10][FEC2]

where FEC1 is the FEC repair packet for the non-reference pictures and FEC2 is the FEC repair packet for the reference pictures.

The likelihood that when a receiving device 3 tunes in, it receives a non-reference frame or a reference frame is 50% in both cases.

If the receiving device 3 tunes in and joins the broadcast/multicast session during the transmission of the non-reference frames chunk, the average time that it needs to wait for the next IDR picture is 0.25 seconds. Playback can start right after receiving FEC2 packet of that GOP. Note that the playback would contain only the reference pictures of the first GOP. In other words, the average tune-in delay would be, 0.5 seconds to buffer the reference frames chunk and computing FEC2 added to the average delay for the receiving device 3 to wait for the next IDR picture, which is 0.25 seconds, together making it 0.75 seconds.

When the receiving device 3 happens to get reference pictures first, it has to wait for the next GOP (0.25 seconds on average) and until the next GOP is completely received (additional 1 seconds). Altogether, the expected tune-in delay becomes 1 second. In other words, the tune-in delay in conventional data transmission ordering is 50% higher than the tune-in delay according to the invention.

In the description above, only one media type is considered. When another media type, transmitted over the same access link, is considered, the following should be noted: The transmission order of media should be such that it minimizes the tune-in delay by arranging the subjectively most important pieces of a GOP period, last. For example, it is probably subjectively pleasing that audio playback is started as soon as possible, even if video could not be played back yet. In this example, audio is aligned with GOP structure and transmitted as last pieces of data for the GOP. In this case, data transmission order becomes: non-reference pictures and the corresponding FEC, reference p pictures, followed by the IDR picture, and the corresponding FEC, audio and the corresponding FEC. This transmission order increases the possibility that at least audio can be decoded and played back from the first FEC block after tuning in.

In the description above, it is assumed that FEC block boundaries are aligned with GOP boundaries. In a more general case of this invention, no such alignment takes place. In such case, the rule that interleaving does not cross FEC block boundaries is still important. In this case, it may be more beneficial that no data from different GOPs is interleaved. Note also that a FEC block may contain greater-than-1 integer number of GOPs.

It should be noted that although the MBMS streaming session was used as an example of a session, any other similar system and session can be used.

What is claimed is:

1. Apparatus for transmitting media information comprising:
    an encoder for encoding at least one media stream;
    a packetizer for forming packets from the encoded media stream, the packets containing application data units, the application data units having a decoding order;
    a packet block generator for generating at least two blocks from the packets;
    an organizer for organizing the packets within a block of the at least two blocks into a first group and a second group, the first group being decodable without reception of said second group;
    an orderer for arranging the transmission order of the packets of said first group succeeding packets of said second group such that the application data units in the transmission order are at least partly in a different order than the decoding order; and
    a transmitter for transmitting the packets according to the transmission order, wherein said media stream comprises at least a video stream and an audio stream, said encoder comprising a video encoder and an audio encoder; wherein said video encoder is adapted to encode the video stream to form coded pictures, said audio encoder is adapted to encode the audio stream to form encoded audio, and said organizer is adapted to organize the encoded audio into said first group and the coded pictures into said second group, wherein said encoder is adapted to encode the video stream to form coded pictures, and said organizer is adapted to organize the coded pictures into a reference picture group and a non-reference picture group, the reference picture group being decodable without reception of the non-reference picture group.

2. The apparatus according to claim 1 wherein said media stream comprises at least a video stream and an audio stream, said encoder comprising a video encoder and an audio encoder; wherein said video encoder is adapted to encode the video stream to form coded pictures, said audio encoder is adapted to encode the audio stream to form encoded audio, and said organizer is adapted to organize the encoded audio into said first group and the coded pictures into said second group.

3. The apparatus according to claim 1 wherein said reorderer and depacketizer are combined into one operational block.

4. A device comprising:
    an encoder for encoding at least one media stream;
    a packetizer for forming packets from the encoded media stream, the packets containing application data units, the application data units having a decoding order;
    a packet block generator for generating at least two blocks from the packets;
    an organizer for organizing the packets within a block into a first group and a second group, the first group being decodable without reception of said second group; and
    an orderer for arranging the transmission order of the packets of said first group succeeding packets of said second group such that the application data units in the transmission order are at least partly in a different order than the decoding order, said device further comprising a controller configured for defining first error correction data for said first group on the basis of the packets of said first group, and a second error correction data for said second group on the basis of the packets of said second group, said packetizer is configured for selecting a first integral group of packets on the basis of said first group and said first error correction data and for selecting a second integral group on the basis of said second group and said second error correction data wherein said first group of packets can be restored from said first integral group and said second group of packet can be restored from said second integral group, and
    wherein the orderer is adapted to order the transmission of said first integral group after the packets of said second integral group are ordered to be transmitted.

5. A device according to claim 4 wherein the packet selector is adapted to select said first integral group to comprise said first group and said second integral group to comprise said second group.

6. A device according to claim 5 wherein the orderer is configured to order the packets in at least one of the groups among said first integral group and said second integral group in reverse decoding order.

7. A device according to claim 4 wherein the encoder is adapted to form reference data units and non-reference data units wherein the organizer is adapted to organize the reference data units into said first group and the non-reference data units into said second group.

8. A device according to claim 7 wherein the reference data units and non-reference data units form more than one IDR period, wherein the orderer is adapted to order the transmission of packets formed from the IDR periods in decoding order of the IDR periods.

9. A device according to claim 4 wherein the packetizer is adapted to select a forward error correction code rate for said first group different from a forward error correction code rate for said second group.

10. A device comprising:
    an encoder for encoding at least one media stream;
    a packetizer for forming packets from the encoded media stream, the packets containing application data units, the application data units having a decoding order;
    a packet block generator for generating at least two blocks from the packets;
    an organizer for organizing the packets within a block into a first group and a second group, the first group being decodable without reception of said second group; and
    an orderer for arranging the transmission order of the packets of said first group succeeding packets of said second group such that the application data units in the transmission order are at least partly in a different order than the decoding order, wherein the encoder is adapted to encode at least two different media types, and the organizer is adapted to organize the packets of one media type into said first group and the packets of another media type into said second group, wherein said one media type is a video stream comprising reference pictures, which are used for the prediction of other inter pictures, and non-reference pictures, which are not used for the prediction of other inter pictures, and the another media type is an audio stream, wherein the organizer is adapted to organize the packets of non-reference pictures and the packets of reference pictures into said first group such that the packets of reference pictures succeed the packets of non-reference pictures.

11. A device comprising:
an encoder for encoding at least one media stream;
a packetizer for forming packets from the encoded media stream, the packets containing application data units, the application data units having a decoding order;
a packet block generator for generating at least two blocks from the packets;
an organizer for organizing the packets within a block into a first group and a second group, the first group being decodable without reception of said second group; and
an orderer for arranging the transmission order of the packets of said first group succeeding packets of said second group such that the application data units in the transmission order are at least partly in a different order than the decoding order,
wherein the encoder is adapted to encode at least two different media types, the media types having been classified according to their importance, wherein the orderer is adapted to order the transmission of packets of the media types in ascending order of importance, wherein the packets of one media type are in said first group and the packets of another media type are in said second group, wherein said one media type is a video stream comprising reference pictures and non-reference pictures, and the another media type is an audio stream, wherein the packets of non-reference pictures and the packets of reference pictures are in said first group such that the packets of reference pictures succeed the packets of non-reference pictures.

12. A device comprising:
a packetizer for forming packets from at least one encoded media stream, the packets containing application data units, the application data units having a decoding order;
a packet block generator for generating at least two blocks from the packets;
an organizer for organizing the packets within a block into a first group and a second group, the first group being decodable without reception of said second group; and
an orderer for arranging the transmission order of the packets of said first group succeeding packets of said second group such that the application data units in the transmission order are at least partly in a different order than the decoding order, wherein the packets of one media type are in said first group and the packets of another media type are in said second group, wherein said one media type is a video stream comprising reference pictures and non-reference pictures, and the another media type is an audio stream, wherein the packets of non-reference pictures and the packets of reference pictures are in said first group such that the packets of reference pictures succeed the packets of non-reference pictures and wherein packets of said another media type succeed said packets of said first media type.

13. A device comprising:
a receiver for receiving packets including at least one encoded media stream and which packets are at least partly in a different order than the decoding order, wherein received packets of one media type are in a first group and received packets of another media type are in a second group, wherein said one media type is a video stream comprising reference pictures and non-reference pictures, and the another media type is an audio stream, wherein the packets of non-reference pictures and the packets of reference pictures are in said first group such that the packets of reference pictures succeed the packets of non-reference pictures and wherein packets of said another media type succeed said packets of said first media type;
a buffer for buffering received packets;
a reorderer for reordering received packets into the decoding order;
a depacketizer for reconstructing the encoded media information from the packets; and
a decoder for decoding media information of the packets.

14. A device according to claim 13 further comprising an error correction data decoder producing packets of the encoded media stream on the basis of received packets.

15. A device according to claim 14 comprising a common memory for the error correction data decoder and the reorderer.

16. A wireless communication device comprising:
an encoder for encoding at least one media stream;
a packetizer for forming packets from the encoded media stream, the packets containing application data units, the application data units having a decoding order;
a packet block generator for generating at least two blocks from the packets;
an organizer for organizing the packets within a block of the at least two blocks into a first group and a second group, the first group being decodable without reception of said second group; and
an orderer for arranging the transmission order of the packets of said first group succeeding packets of said second group such that the application data units in the transmission order are at least partly in a different order than the decoding order, wherein packets of one media type are in said first group and packets of another media type are in said second group, wherein said one media type is a video stream comprising reference pictures and non-reference pictures, and the another media type is an audio stream, wherein the packets of non-reference pictures and the packets of reference pictures are in said first group such that the packets of reference pictures succeed the packets of non-reference pictures and wherein packets of said another media type succeed said packets of said first media type.

17. A wireless communication device comprising:
a receiver for receiving packets including at least one encoded media stream and which packets are at least partly in a different order than a decoding order, wherein received packets of one media type are in a first group and received packets of another media type are in a second group, wherein said one media type is a video stream comprising reference pictures and non-reference pictures, and the another media type is an audio stream, wherein the packets of non-reference pictures and the packets of reference pictures are in said first group such that the packets of reference pictures succeed the packets of non-reference pictures and wherein packets of said another media type succeed said packets of said first media type;
a buffer for buffering received packets;
a reorderer for reordering received packets into the decoding order;
a depacketizer for reconstructing the encoded media information from the packets; and
a decoder for decoding media information of the packets.

18. A method for transmitting media information from a transmitting device to a receiving device comprising:

encoding at least one media stream, wherein said media stream comprises at least a video stream and an audio stream, the video stream comprising coded pictures, said audio stream comprising encoded audio, said encoded audio organized into a first group and the coded pictures into a second group, said coded pictures organized into a reference picture group and a non-reference picture group, the reference picture group being decodable without reception of the non-reference picture group;

forming packets from the encoded media stream, the packets containing application data units, the application data units having a decoding order;

generating at least two blocks from the packets;

organizing the packets of the at least two blocks into a first group and a second group, the first group being decodable without reception of said second group;

arranging the transmission order of the packets of said first group succeeding packets of said second group such that the application data units in the transmission order are at least partly in a different order than the decoding order; and transmitting the packets to the receiving device according to the transmission order.

19. A device comprising a controller and a memory for transmitting a signal carrying encoded media information to a receiving device, said encoded media information comprising packets from at least one encoded media stream, the packets containing application data units, the application data units having a decoding order; and at least two blocks are generated from the packets by said controller of said device running machine executable steps, wherein the packets of the signal are ordered by said controller executing said steps by:

organizing packets within a block of the at least two blocks into a first group and a second group, the first group being decodable without reception of said second group; and arranging the transmission order of the packets of said first group succeeding packets of said second group such that the application data units in the transmission order are at least partly in a different order than the decoding order, wherein said packets comprise packets of at least two different media types, wherein the packets of one media type are in said first group and the packets of another media type are in said second group, wherein said one media type is a video stream comprising reference pictures and non-reference pictures, and the another media type is an audio stream, wherein the packets of non-reference pictures and the packets of reference pictures are in said first group such that the packets of reference pictures succeed the packets of non-reference pictures.

20. A device according to claim 19 wherein a forward error correction code rate have been selected for said first group different from a forward error correction code rate for said second group.

21. A controller comprising a software program for transmitting media information from a first device to a second device, the software program comprising machine executable steps for:

encoding a media stream, wherein said media stream comprises at least a video stream and an audio stream, the video stream comprising coded pictures, said audio stream comprising encoded audio, said encoded audio organized into a first group and the coded pictures into a second group, said coded pictures organized into a reference picture group and a non-reference picture group, the reference picture group being decodable without reception of the non-reference picture group;

forming packets from the encoded media stream, the packets containing application data units, the application data units having a decoding order;

generating at least two blocks from the packets;

organizing the packets within a block of the at least two blocks into a first group and a second group, the first group being decodable without reception of said second group;

arranging the transmission order of the packets of said first group succeeding packets of said second group such that the application data units in the transmission order are at least partly in a different order than the decoding order; and transmitting the packets to the receiving device according to the transmission order.

22. A device comprising a controller and a memory for coding a media steam or decoding a coded media stream, comprising a first integral group of packets and a second integral group of packets;

said first integral group of packets transmitted after said second integral group of packets;

said first integral group of packets decodable to first packets of the coded media stream;

a second integral group of packets decodable to second packets of the coded media stream;

said first packets of the coded media stream decodable to uncompressed media samples without decoding of said second packets of the coded media stream;

at least one packet in said second packets of the coded media stream succeeding in decoding order at least one packet in said first packets of the coded media stream wherein said coded media stream comprises packets of at least two different media types, wherein the packets of one media type are in said first integral group and the packets of another media type are in said second integral group, wherein said one media type is a video stream comprising reference pictures and non-reference pictures, and the another media type is an audio stream, wherein the packets of non-reference pictures and the packets of reference pictures are in said first integral group such that the packets of reference pictures succeed the packets of non-reference pictures and wherein packets of said another media type succeed said packets of said one media type.

23. A device according to claim 22 in which decoding of both said first packets of a coded media stream and said second packets of a coded media stream improves a subjective quality compared to decoding of said first packets of the coded media stream.

24. A device according to claim 22 in which decoding of both said first packets of the coded media stream and said second packets of the coded media stream increases the output sample rate compared to decoding of said first packets of the coded media stream.

25. A device according to claim 22 wherein the packets within at least one of said first integral group of packets and said second integral group of packets are in reverse decoding order.

26. A device comprising a controller and a memory for coding or decoding a signal comprising at least two coded media streams wherein each media stream is organized into super blocks of media data;

earliest and latest media decoding time is derivative for super blocks;

super blocks do not overlap in decoding time;

super blocks are ordered within the signal in ascending order of decoding time;

super block boundaries in decoding time of one media stream are within a defined range compared to super block boundaries of another media stream; and     at least one inter-stream frame is comprised of super blocks of a different stream whose boundaries are within said defined range, wherein there is at least a first group of data of first media type and a second group of data of second media type;

said first group of data is not interleaved with said second group of data in the signal, wherein said first group of data precedes said second group of data if the decoded output of said first group of data is subjectively less important than the decoded output of said second group of data.

27. A receiving device comprising:

a receiver for receiving packets at least partly in an order different than a decoding order, wherein received video packets are in a first group and received audio packets are in a second group, wherein said received video packets form a video stream comprising reference pictures and non-reference pictures, and the received audio packets comprise an audio stream, wherein video packets of non-reference pictures and video packets of reference pictures are in said first group such that the packets of reference pictures succeed the packets of non-reference pictures and wherein said audio packets succeed said video packets;

a reorderer for reordering received packets into the decoding order; and a depacketizer for reconstructing the encoded media information from the packets.

* * * * *